(12) United States Patent
Crain, Jr.

(10) Patent No.: US 9,411,120 B2
(45) Date of Patent: Aug. 9, 2016

(54) MULTI-CABLE BREAKOUT ASSEMBLY

(71) Applicant: CommScope, Inc. of North Carolina, Hickory, NC (US)

(72) Inventor: Charles T. Crain, Jr., Melissa, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 327 days.

(21) Appl. No.: 14/208,127

(22) Filed: Mar. 13, 2014

(65) Prior Publication Data

US 2014/0262431 A1    Sep. 18, 2014

Related U.S. Application Data

(60) Provisional application No. 61/788,439, filed on Mar. 15, 2013.

(51) Int. Cl.
| | | |
|---|---|---|
| *H01B 7/02* | (2006.01) | |
| *H01B 7/08* | (2006.01) | |
| *G02B 6/44* | (2006.01) | |
| *H02G 3/04* | (2006.01) | |

(52) U.S. Cl.
CPC ............ *G02B 6/4471* (2013.01); *H02G 3/0487* (2013.01)

(58) Field of Classification Search
CPC ........................... H02G 3/0487; G02B 6/4471
USPC .......................................... 174/117 M, 117 R
See application file for complete search history.

(56) References Cited

U.S. PATENT DOCUMENTS

| | | | | | |
|---|---|---|---|---|---|
| 349,893 | A | * | 9/1886 | McGill ................ | H02G 3/0487 138/156 |
| 2,991,328 | A | * | 7/1961 | Lay ...................... | H01B 7/0045 156/55 |
| 3,180,923 | A | * | 4/1965 | Gow .................... | H02G 3/0487 156/290 |
| 3,984,622 | A | * | 10/1976 | Ross ...................... | H02G 3/00 156/51 |
| 3,988,399 | A | * | 10/1976 | Evans ................... | B29C 61/003 264/230 |
| 4,693,767 | A | * | 9/1987 | Grzanna .............. | H02G 15/013 156/49 |
| 4,808,771 | A | * | 2/1989 | Orr, Jr. ................ | H01B 7/083 139/425 R |
| 4,920,234 | A | * | 4/1990 | Lemke ................. | H01B 11/085 156/53 |
| 5,084,594 | A | * | 1/1992 | Cady .................... | H01B 7/083 174/117 F |
| 5,373,103 | A | * | 12/1994 | Orr, Jr. ................. | H01B 7/083 174/117 M |
| 5,463,186 | A | * | 10/1995 | Schricker ............. | H01B 7/0892 174/113 R |
| 5,502,287 | A | * | 3/1996 | Nguyen ............... | H01B 7/0838 156/53 |

(Continued)

*Primary Examiner* — Timothy Thompson
*Assistant Examiner* — Rhadames J Alonzo Miller
(74) *Attorney, Agent, or Firm* — Myers Bigel & Sibley, P.A.

(57) ABSTRACT

A multi-cable breakout assembly includes: a plurality of cables arranged in a rectangular array of M rows×N columns, wherein M and N are positive whole numbers greater than one; a first sleeve that encircles the plurality of cables; first and second ribbon members, the first ribbon member being threaded through the plurality of cables to separate the cables into M rows; and the second ribbon member being threaded through the plurality of cables to separate the cables into N columns; and a second sleeve that overlies an end of the first sleeve and the first and second ribbon members.

20 Claims, 3 Drawing Sheets

(56) References Cited

U.S. PATENT DOCUMENTS

| | | | | |
|---|---|---|---|---|
| 5,625,737 A * | 4/1997 | Saito | G02B 6/3616 | 242/125.1 |
| 5,821,466 A * | 10/1998 | Clark | H01B 11/22 | 174/113 R |
| 5,940,962 A * | 8/1999 | Shima et al. | B60R 16/0215 | 174/105 R |
| 6,215,932 B1 * | 4/2001 | Hardwick, III et al. | G02B 6/4411 | 385/109 |
| 6,434,307 B1 * | 8/2002 | Church | G02B 6/4403 | 385/114 |
| 7,054,536 B2 * | 5/2006 | Sun | G02B 6/4476 | 385/114 |
| 7,166,805 B2 * | 1/2007 | Robinson et al. | G02B 6/4471 | 174/135 |
| 7,188,415 B2 * | 3/2007 | Robinson et al. | G02B 6/4471 | 174/154 |
| 8,653,372 B2 * | 2/2014 | Muneyasu et al. | B60R 16/0207 | 174/110 R |
| 2008/0296037 A1 * | 12/2008 | Burland et al. | H02G 3/0487 | 174/36 |
| 2010/0181268 A1 * | 7/2010 | Benson | F16L 3/26 | 211/60.1 |
| 2011/0146072 A1 * | 6/2011 | Biesse et al. | H01R 9/032 | 29/887 |
| 2012/0187271 A1 * | 7/2012 | Komiya | F16L 3/015 | 248/634 |
| 2015/0366106 A1 * | 12/2015 | Yanagihara | H02G 3/0487 | 174/72 A |

* cited by examiner

MULTI-CABLE BREAKOUT ASSEMBLY

RELATED APPLICATION

The present application claims priority from and the benefit of U.S. Provisional Patent Application Ser. No. 61/788,439, filed Mar. 15, 2013, the disclosure of which is hereby incorporated herein by reference in its entirety.

FIELD OF THE INVENTION

The present invention relates generally to electrical cables and conductors, and more particularly to assemblies for identifying individual conductors and/or cables within a multi-conductor cable.

BACKGROUND

Insulated conductors such as those used in communications cable are often provided as twisted pairs, wherein two insulated conductors are twisted about each other to form a two conductor group, or twisted pair. A typical configuration for these communications cables comprises two or more twisted pairs of insulated conductors bundled together and contained in a cable jacket to form a cable. This configuration can facilitate the installation of the cable. In addition, the cable can be connected to other cable components by stripping the cable jacket and making the proper connections between the insulated conductors.

Such cables may be bundled together in an assembly of 4, 8, 12, 16 or more cables. It can be important to be able to identify individual conductors and/or cables of conductors and to distinguish them from each other quickly to facilitate installation and/or subsequent re-connection of the conductors/cables. As such, it is typically desirable to maintain the conductors and cables in an organized fashion that enables individual conductors and cables to be easily identified.

One solution is offered in U.S. Pat. No. 7,166,805 to Robinson et al. This approach arranges a set of 16 cables into a 4×4 array, then employs spacers to separate "columns" of cables. The spacers and cables are held in place with a collar that encircles the cables. It may be desirable to provide other solutions to the problem of cable organization.

SUMMARY

As a first aspect, embodiments of the invention are directed to a multi-cable breakout assembly. The multi-cable breakout assembly includes: a plurality of cables arranged in a rectangular array of M rows×N columns, wherein M and N are positive whole numbers greater than one; a first sleeve that encircles the plurality of cables; first and second ribbon members, the first ribbon member being threaded through the plurality of cables to separate the cables into M rows; and the second ribbon member being threaded through the plurality of cables to separate the cables into N columns; and a second sleeve that overlies an end of the first sleeve and the first and second ribbon members.

As a second aspect, embodiments of the invention are directed to a multi-cable breakout assembly, comprising: a plurality of cables arranged in a rectangular array of M rows×N columns, wherein M and N are positive whole numbers greater than one; a first sleeve that encircles the plurality of cables; and first and second ribbon members, the first ribbon member being spirally threaded through the plurality of cables to separate the cables into M rows; and the second ribbon member being spirally threaded through the plurality of cables to separate the cables into N columns.

As a third aspect, embodiments of the invention are directed to a multi-cable breakout assembly, comprising: a plurality of cables arranged in a rectangular array of M rows×N columns, wherein M and N are positive whole numbers greater than one; and first and second ribbon members, the first ribbon member being threaded through the plurality of cables to separate the cables into M rows; and the second ribbon member being threaded through the plurality of cables to separate the cables into N columns. The first and second ribbon members are threaded through the cables such that each of the cables is separated from each of the other cables.

DETAILED DESCRIPTION

Figure 1:
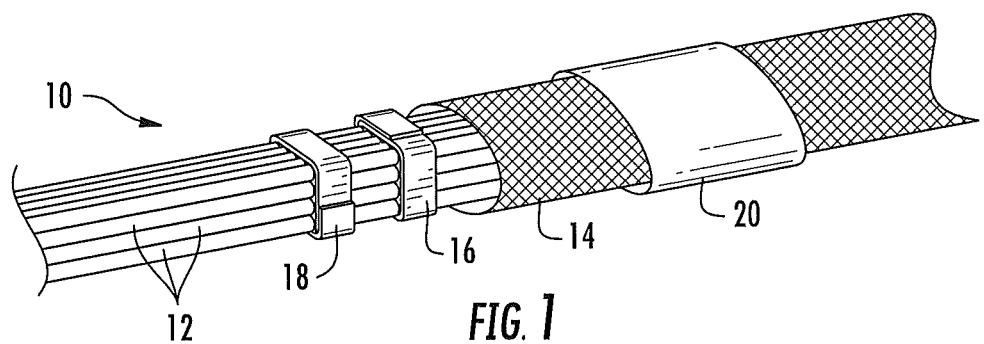
FIG. 1 is an exploded perspective view of a multi-cable breakout assembly according to embodiments of the present invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Referring now to the figures, a multi-cable breakout assembly, designated broadly at 10, is shown in FIGS. 1-4. The breakout assembly 10 includes sixteen individual cables 12 which are provided as a bundle or array. In the illustrated embodiment, the cables 12 are arranged in a 4×4 array, but as discussed below, may take a variety of configurations and may include more or fewer cables. The cables 12 can be any conventional cables known to those of skill in this art and need not be described in detail herein; typically such cables would be Cat 5, Cat 5(a), Cat 6, Cat 7, or even Cat 8 cables, and would include four twisted pairs of conductors in each cable. The breakout assembly 10 may also be suitable for fiber optic or other electrical cables, such as power cables As shown in the exploded views of FIGS. 1 and 2, the breakout assembly 10 also includes a mesh sleeve 14 that gathers the cables 12 as a bundle. The mesh sleeve 14, which is typically formed of a woven or braided polymeric material, can provide mechanical protection to the cables 12. An exemplary sleeve material is EXPANDO® sleeving (available from Federal-Mogul Corporation, Southfield, Mich.).

The breakout assembly 10 also includes two flexible ribbon members 16, 18 that may be positioned adjacent each other near one end of the mesh sleeve 14. The ribbon members 16, 18 are threaded between the cables 12 to separate them into individual units; the ribbon member 16 is routed generally in a spiral to separate the "columns" of cables 12 (see FIG. 4A), and the ribbon member 18 is routed generally in a spiral to separate the "rows" of cables 12 (see FIG. 4B). More specifically, the ribbon member 16 begins at the upper end of the cables 12 between cables A5 and B1 (i.e., between the second and third columns—see FIG. 4A), is routed downwardly to the bottom of the array, passes below the third column, is routed upwardly between the third and fourth columns, passes over the third and second columns, and is routed downwardly between the first and second columns. The ribbon member 18 begins at the leftmost end of the array (from the vantage point of FIG. 4B) between cables A2 and A3 and extends to the right between the second and third rows, passes to the right of the second row, is routed between the first and second rows, passes to the left of the second and third rows, and is routed between the third and fourth rows. The combined effect of both ribbon members 16, 18 separates individual cables 12 from each other, with each of the cables 12 in a predictable, easily recognized position.

Figure 4A:
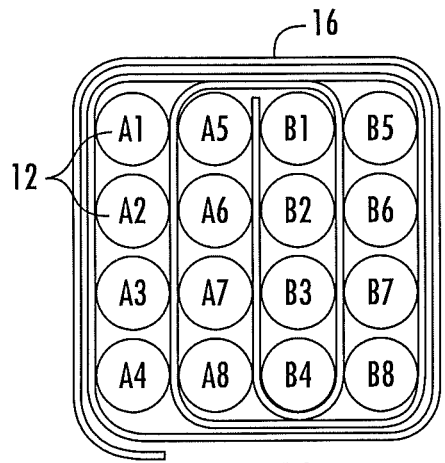
FIGS. 4A and 4B are section views taken through, respectively, lines 4A-4A and 4B-4B of FIG. 2.
Figure 4B:
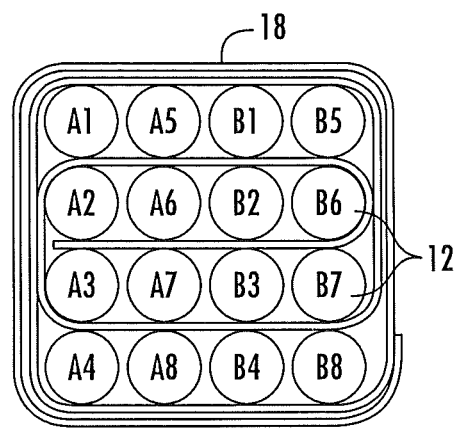

As an example, it can be seen in FIG. 4A that cable A1 (located at the top, left corner of array) is separated from adjacent cable A5 by the ribbon member 16, and in FIG. 4B that cable A1 is separated from adjacent cable A2 by the ribbon member 18. Thus, cable A1 is separated from the remainder of the cables 12. Each of the remaining cables 12 is separated from each of the other cables 12 by the ribbon members 16, 18 in similar fashion.

In the illustrated embodiment, after separating the cables 12 into rows or columns, each of the ribbon members 16, 18 wraps around the outside of the bundle of cables 12 and attaches to itself to fully encircle and bind the cables 12. In some embodiments, the ribbon members 16, 18 are formed of hoop-and-loop material (commonly referred to by the trade name VELCRO®), which is easily and quickly attached to itself after wrapping. Those skilled in this art will appreciate that other types of flexible ribbon members, such as tapes (adhesive or non-adhesive), belts, strips, and the like, may also be employed in the breakout assembly 10.

Figure 3:
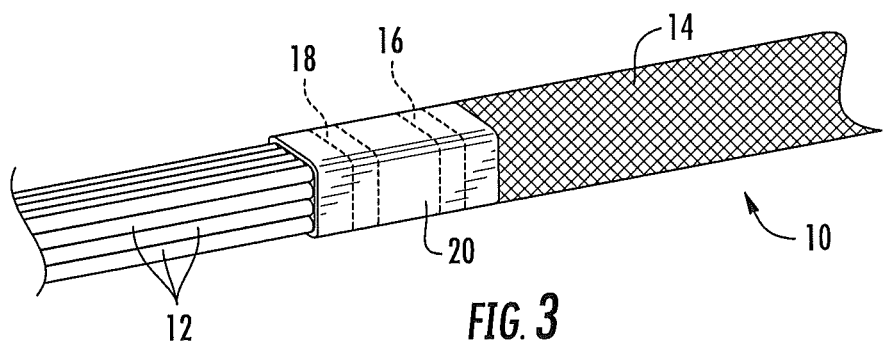
FIG. 3 is an assembled perspective view of the breakout assembly of FIG. 1.

The breakout assembly 10 also includes a heat-shrinkable sleeve 20. As can be seen in FIG. 3, the heat-shrinkable sleeve 20 covers the ribbon members 16, 18 and one end of the mesh sleeve 14 and maintains them in position. The heat-shrinkable sleeve 20 is typically formed of an elastomeric material that shrinks when heated; an exemplary material is a rubber or a polyolefin.

Figure 2:
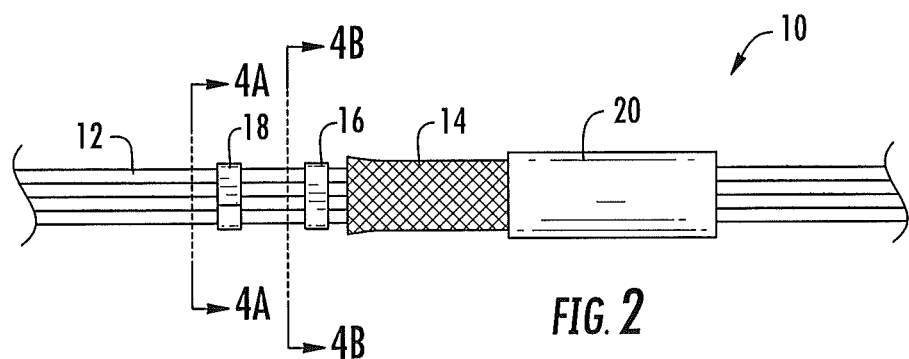
FIG. 2 is an exploded side view of the breakout assembly of FIG. 1.

As can be understood by examination of FIGS. 1-3, the breakout assembly 10 can be formed by inserting the cables 12 within the mesh sleeve 14, then interweaving the ribbon members 16, 18 with the cables 12 as shown in FIGS. 4A and 4B. The heat-shrinkable sleeve 20 is then applied over the end of the mesh sleeve 14 and the ribbon members 16, 18. Heat is applied to the heat-shrinkable sleeve 20 to shrink it onto the ribbon members 16, 18, the mesh sleeve 14, and the cables 12.

The breakout assembly 10 can provide a unit that retains the individual cables 12 in an organized fashion that enables them to be easily and quickly accessed by a technician during installation and/or reconnection of devices with the cables 12.

Figure 5A:
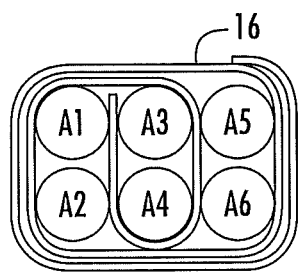
FIGS. 5A-9B are section views of alternative embodiments of multi-cable breakout assemblies of the present invention showing how wrapping of the ribbon members divides the cables into individual units.
Figure 5B:
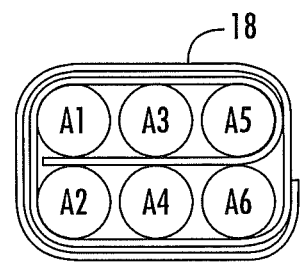
Figure 6A:
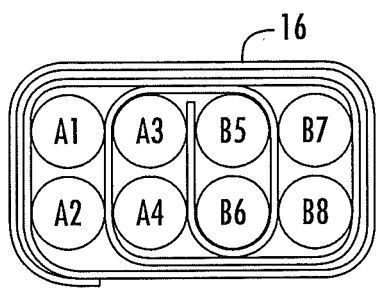
Figure 6B:
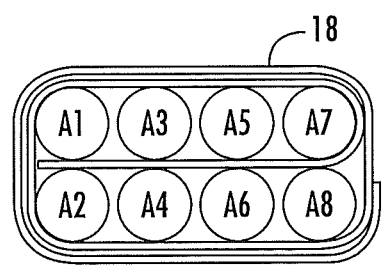
Figure 7A:
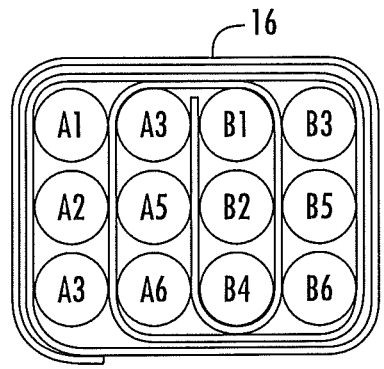
Figure 7B:
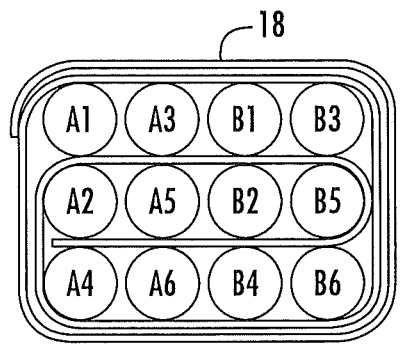
Figure 8A:
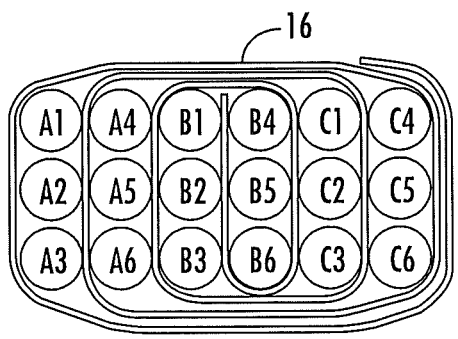
Figure 8B:
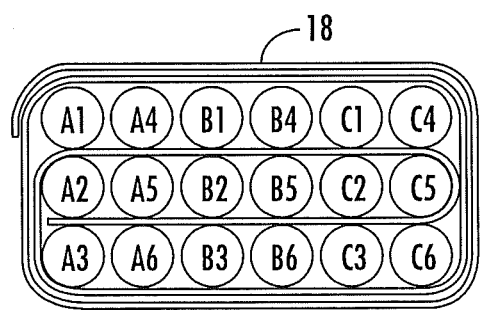
Figure 9A:
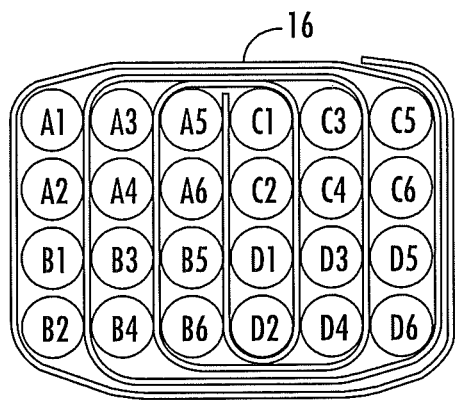
Figure 9B:
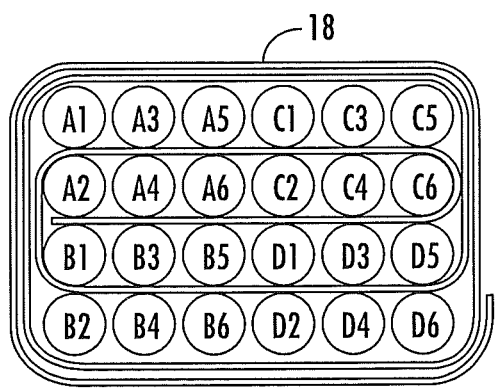

FIGS. 5A-9B illustrate how the ribbon members 16, 18 can be employed with bundles of cables that have different numbers or arrangements of cables. For example, FIGS. 5A and 5B illustrate a 2×3 array, FIGS. 6A and 6B illustrate a 2×4 array, FIGS. 7A and 7B illustrate a 3×4 array, FIGS. 8A and 8B illustrate a 3×6 array, and FIGS. 9A and 9B illustrate a 4×6 array. In each instance, the individual cables are separated from each of the other cables in the array by the ribbon members 16, 18, with one of the ribbon members 16, 18 separating the cables into rows and the other of the ribbon members 18, 16 separating the cables into columns. Thus, the same technique may be applied to any rectangular array of cables having M rows and N columns, wherein M and N are positive whole numbers greater than 1.

Those of skill in this art will appreciate that the breakout assembly may take other forms. As shown above, different numbers and/or types of cables may be employed. Alternatively, one or both of the mesh sleeve and the heat-shrinkable sleeve may be omitted, and either or both may be formed of different materials. Other alternatives will be apparent to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without That which is claimed is:

1. A multi-cable breakout assembly, comprising:
   a plurality of cables arranged in a rectangular array of M rows×N columns, wherein M and N are positive whole numbers greater than one;
   a first sleeve that encircles the plurality of cables;
   first and second ribbon members, the first ribbon member being threaded through the plurality of cables to separate the cables into M rows; and the second ribbon member being threaded through the plurality of cables to separate the cables into N columns; and
   a second sleeve that overlies an end of the first sleeve and the first and second ribbon members.

2. The multi-cable breakout assembly defined in claim 1, wherein the first and second ribbon members are formed of hook-and-loop material.

3. The multi-cable breakout assembly defined in claim 1, wherein at least one of the first and second ribbon members is threaded through the plurality of cables in a spiral pattern.

4. The multi-cable breakout assembly defined in claim 3, wherein both of the first and second ribbon members are threaded through the plurality of cables in a spiral pattern.

5. The multi-cable breakout assembly defined in claim 1, wherein the cables are twisted pair cables.

6. The multi-cable assembly defined in claim 1, wherein first sleeve comprises a mesh sleeve.

7. The multi-cable assembly defined in claim 1, wherein the second sleeve comprises a heat-shrinkable sleeve.

8. The multi-cable assembly defined in claim 1, wherein the first and second ribbon members are threaded through the cables such that each of the cables is separated from each of the other cables.

9. A multi-cable breakout assembly, comprising:
   a plurality of cables arranged in a rectangular array of M rows×N columns, wherein M and N are positive whole numbers greater than one;
   a first sleeve that encircles the plurality of cables; and
   first and second ribbon members, the first ribbon member being spirally threaded through the plurality of cables to separate the cables into M rows; and the second ribbon member being spirally threaded through the plurality of cables to separate the cables into N columns.

10. The multi-cable breakout assembly defined in claim 1, wherein the first and second ribbon members are formed of hook-and-loop material.

11. The multi-cable breakout assembly defined in claim 1, wherein the cables are twisted pair cables.

12. The multi-cable assembly defined in claim 1, wherein first sleeve comprises a mesh sleeve and the multi-cable assembly further comprises a heat-shrinkable sleeve that overlies an end of the first sleeve and the first and second ribbon members.

13. The multi-cable assembly defined in claim 1, wherein the first and second ribbon members are threaded through the cables such that each of the cables is separated from each of the other cables.

14. A multi-cable breakout assembly, comprising:
   a plurality of cables arranged in a rectangular array of M rows×N columns, wherein M and N are positive whole numbers greater than one; and
   first and second ribbon members, the first ribbon member being threaded through the plurality of cables to separate the cables into M rows; and the second ribbon member being threaded through the plurality of cables to separate the cables into N columns;
   wherein the first and second ribbon members are threaded through the cables such that each of the cables is separated from each of the other cables.

15. The multi-cable assembly defined in claim 14, further comprising a first sleeve that encircles the plurality of cables and a second sleeve that overlies an end of the first sleeve and the first and second ribbon members.

16. The multi-cable assembly defined in claim 14, wherein the second sleeve comprises a heat-shrinkable material.

17. The multi-cable breakout assembly defined in claim 1, wherein at least one of the first and second ribbon members is threaded through the plurality of cables in a spiral pattern.

18. The multi-cable breakout assembly defined in claim 3, wherein both of the first and second ribbon members are threaded through the plurality of cables in a spiral pattern.

19. The multi-cable breakout assembly defined in claim 1, wherein the first and second ribbon members are formed of hook-and-loop material.

20. The multi-cable breakout assembly defined in claim 1, wherein the first sleeve comprises a mesh material.

* * * * *